Dec. 5, 1944.  A. CANTOR ET AL  2,364,126
RECEPTACLE CLOSURE
Filed Dec. 9, 1941  3 Sheets-Sheet 1
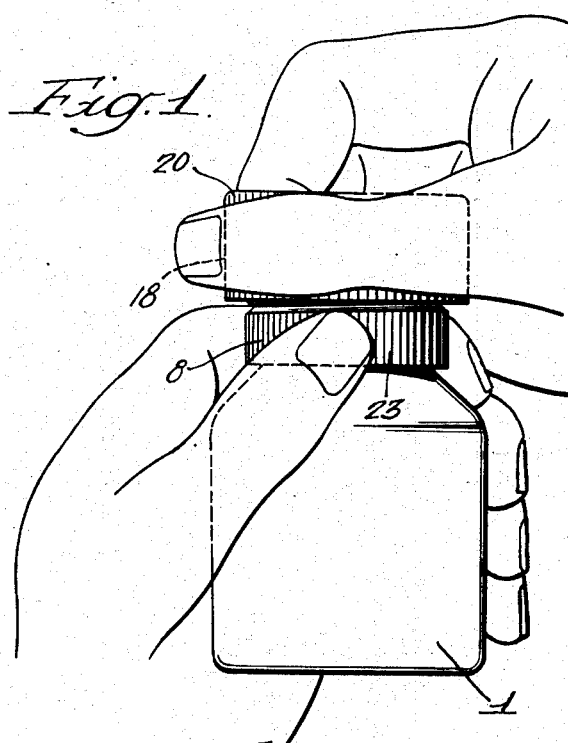
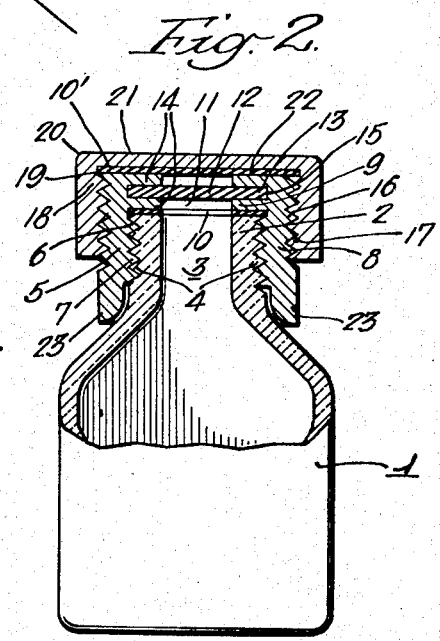
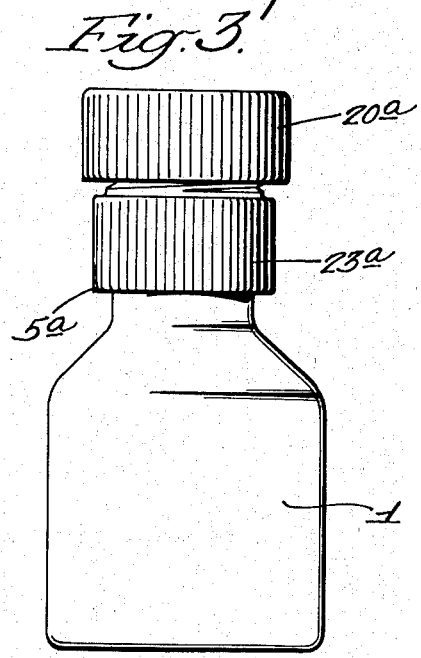
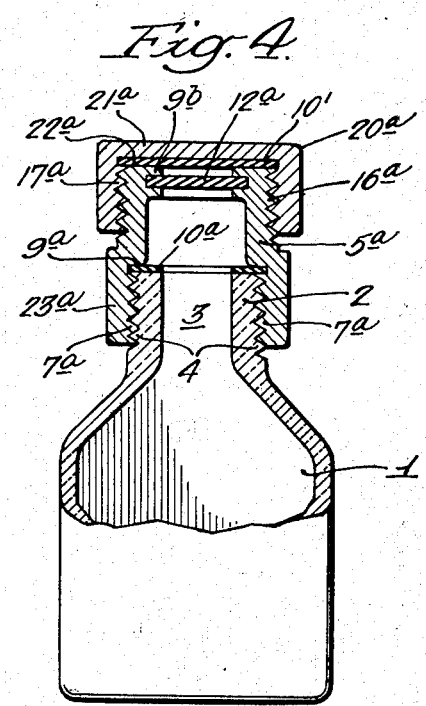
Inventors:-
Abraham Cantor
Herman A. Shelanski
by their Attorneys Dec. 5, 1944.  A. CANTOR ET AL  2,364,126
RECEPTACLE CLOSURE
Filed Dec. 9, 1941  3 Sheets-Sheet 2
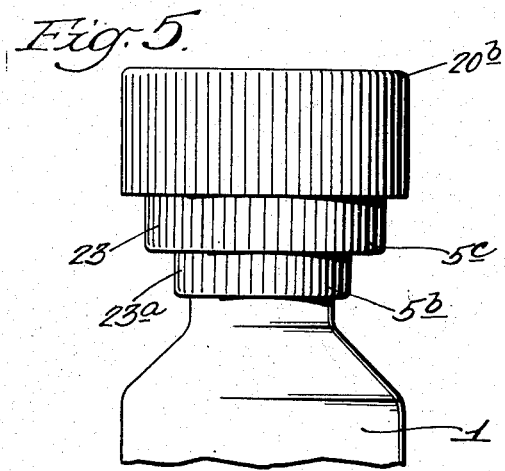
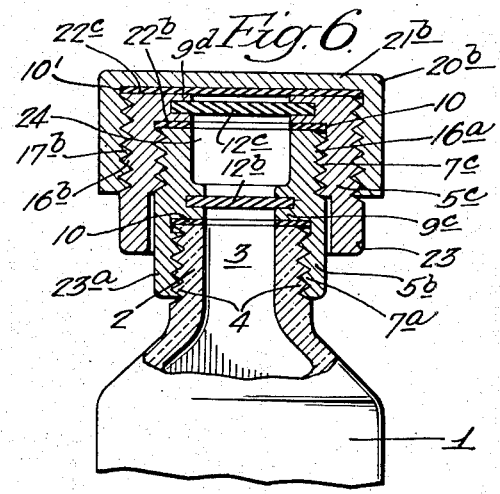
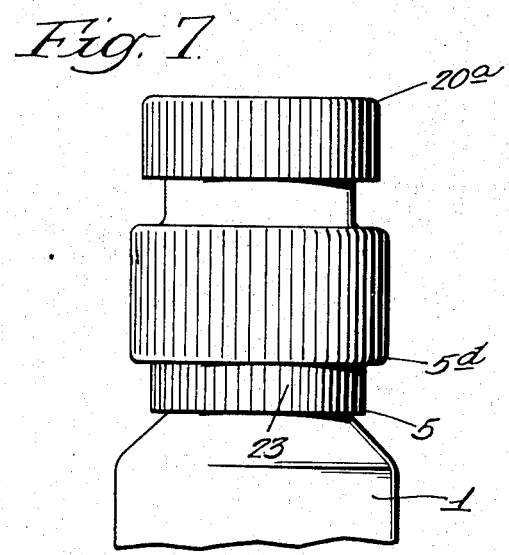
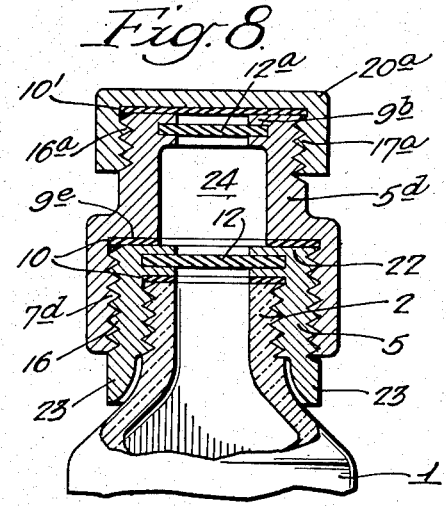
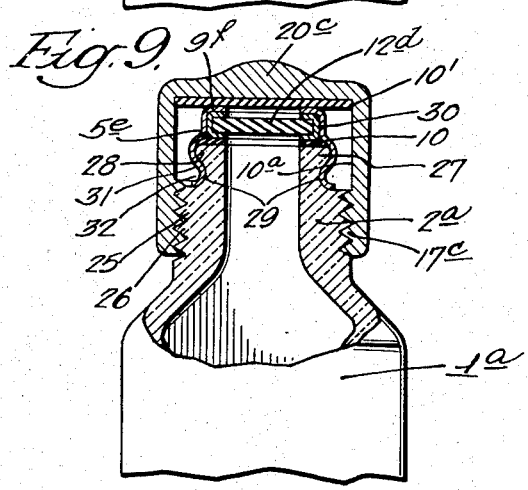
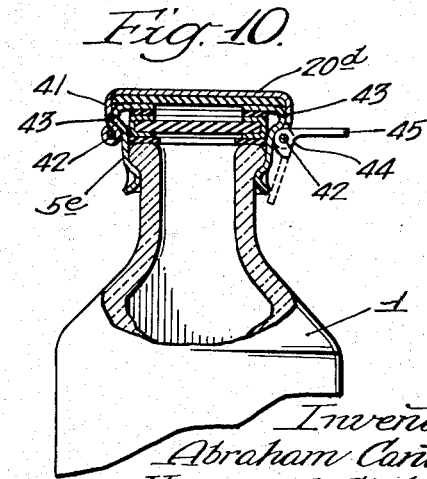
Inventors:
Abraham Cantor
Herman A. Shelanski
by their Attorneys
Howson & Howson Dec. 5, 1944.  A. CANTOR ET AL  2,364,126
RECEPTACLE CLOSURE
Filed Dec. 9, 1941   3 Sheets-Sheet 3
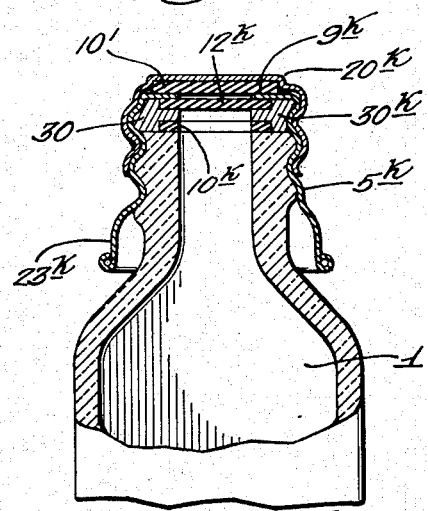
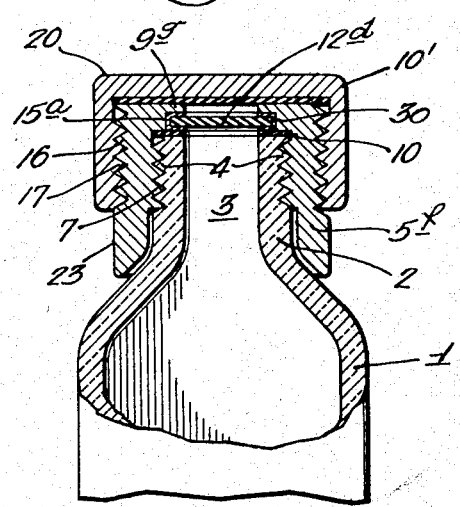
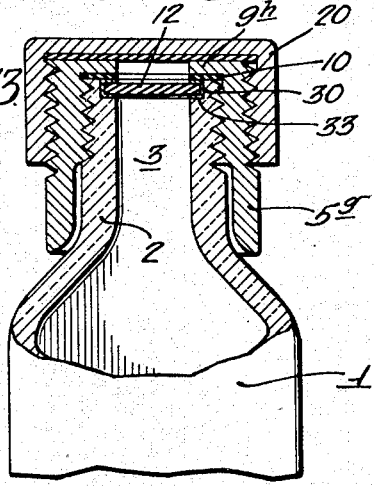
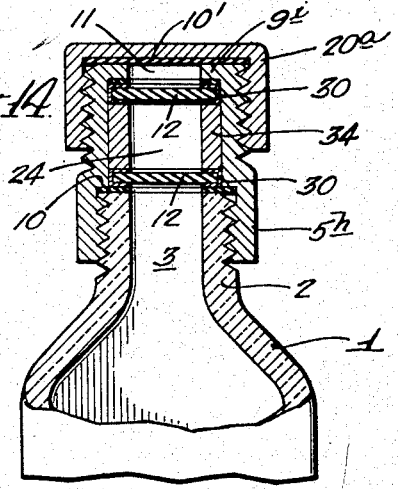
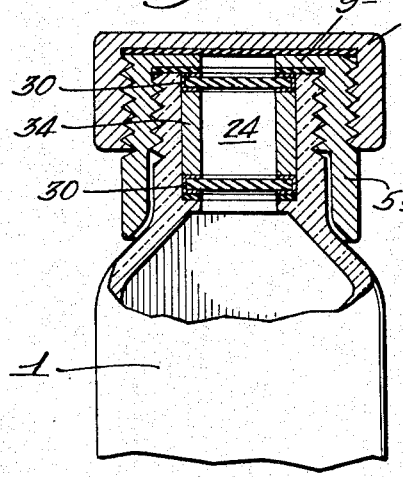
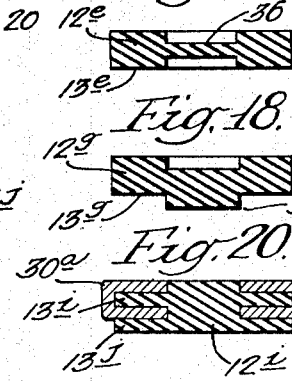
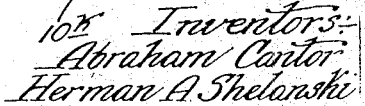
Inventors:
Abraham Cantor
Herman A Shelanski
by their Attorneys
Howson & Howson Patented Dec. 5, 1944

2,364,126

UNITED STATES PATENT OFFICE 2,364,126

RECEPTACLE CLOSURE

Abraham Cantor and Herman A. Shelanski, Philadelphia, Pa.

Application December 9, 1941, Serial No. 422,280

5 Claims. (Cl. 215—43)

This invention relates to a package structure for biologicals, pharmaceuticals, cosmetics, and other materials, in liquid or dry state, under vacuum or positive internal pressure.

The principal object of the present invention is to provide a single or multidose package structure which will be absolutely sealed against the entrance of extraneous air or gases into the container, the permeation of extraneous moisture into the container, and the escape of liquid or gaseous substance from the container.

Another object of the present invention is to provide a package for mixable substances, wherein the components are maintained separately within the package for mixing therein to the exclusion of extraneous air or moisture.

In the packaging of biologicals or pharmaceuticals in a liquid or dry state, it is usually advisable and, for some products, absolutely essential that extraneous gases or vapors be prevented from entering the container until its contents are exhausted. It is, therefore, common practice to package certain materials in single-dose containers, usually in the form of a glass enclosure, such as a tube or vial, and to fuse the normally open end thereof to seal the package. The contents are removed by breaking the fused end of the tube.

In some instances, the materials are packaged in glass containers provided with rubber stoppers, through which the contents are withdrawn by a hypodermic needle forced through such stopper.

Each of the above noted types of package has definite advantages over the other, i. e. the fused glass tube prevents the diffusion of water or vapor gases into the container but is limited to single dosages, while the rubber-stoppered container is adaptable for multidose use in that it permits fractional portions of the contents to be removed by puncturing the rubber stopper with a hypodermic needle, but the puncturing of the stopper, repeatedly, increases its permeability. The removed contents are usually replaced by an equal volume of air.

In the case of multidose packages provided with the puncturable rubber stopper, difficulty is encountered in packaging under vacuum or under positive internal pressure of an inert gas inserted to offset the introduction of air as fractional portions of the contents are periodically removed, due to the normal permeability of the rubber and its increase by repeated puncturings.

To offset the normal permeability of the rubber stopper, it is frequently coated, after packaging, with a liquid sealing compound.

Other disadvantages attending the rubber-stoppered multidose packages of the present, lie in its dislodgment by and leakage of internal pressure, if attempt were made to introduce an inert gas under positive pressure; and leakage around and through the stopper if an attempt were made to draw a vacuum in the package after stoppering.

The above disadvantages make the use of the rubber-stoppered package inadvisable with materials which are subject to deterioration in the presence of air or other gases. Moreover, there is no stoppered container commercially available at the present time which conveniently permits the introduction of known gas mixtures, and their retention within the container, by which the culturing of certain microorganisms would be possible.

The package structure, which will be fully disclosed hereinafter, is adapted to overcome each and all of the above noted fallacies of the packages commercially available at the present time, and in addition, the package structure of the present invention is particularly adaptable for packaging lyophiled and cryochem dried products, i. e. products dried from a frozen state.

In the accompanying drawings:

Fig. 1 is a side elevation of a preferred form of the package;

Fig. 2 is a vertical longitudinal sectional view of the preferred form of container shown in Fig. 1, using a single puncturable diaphragm across the entrance to the container;

Fig. 3 is a view similar to Fig. 1 showing a modified arrangement of the elements;

Fig. 4 is a vertical section of the structure shown in Fig. 3;

Fig. 5 is a side elevation of a modified form of the package;

Fig. 6 is a vertical sectional view of the structure illustrated in Fig. 5 and showing a pair of axially-spaced puncturable diaphragms lying transversely to the axis of the entrance to the container;

Fig. 7 is a side elevation of another modified form of the package;

Fig. 8 is a vertical section of the structure illustrated in Fig. 7 and shows a modified arrangement of the elements using a double diaphragm;

Figs. 9, 10 and 11 are vertical sectional views showing still further modified forms of the invention;

Figs. 12 and 13 are vertical sectional views similar to Fig. 2 showing the single diaphragm in a modified arrangement;

Figs. 14 and 15 are vertical sectional views similar to Fig. 4 showing the double diaphragm in a modified arrangement; and Figs. 16, 17, 18, 19, 20 and 21 show modified forms of diaphragms.

In Figs. 1 and 2, the main container 1 is shown in the form of a glass bottle having an axially-extending neck 2 in which is formed an entrance opening 3, coaxial with the neck 2, to afford communication with the interior of the container 1. Obviously, the container 1 may be of any desired shape and may be composed of any suitable material which will be impervious to air and moisture, and the neck 2 and opening 3 therein may be of any desired dimensions in accordance with the use to which the package is to be put. The neck 2 is provided with external screw threads 4 which may be of any desired shape in longitudinal section.

Rigidly secured to the neck 2 is a primary closure 5 comprising a rigid body portion having an axial recess 6 provided with internal screw threads 7 adapted for threaded engagement with the external screw threads 4 of the neck 2, for positively locking the closure 5 against axial displacement with respect to the neck 2 by any differential pressures internally and externally of the container 1.

A sleeve-like portion 8 of the primary closure 5 surrounds the neck 2 and is provided with an internal flange 9 adapted to be seated tightly against the end of the neck 2, with a ring or washers of rubber or other suitable material 10 interposed between the end of the bottle-neck and the underside of the flange 9 to form a tight seal therebetween. The annular flange 9 provides an axial opening 11 in the primary closure 5, in axial alignment with the entrance opening 3 of the container 1.

The axial opening 11 of the closure 5, and consequently the entrance opening 3 of the container 1, are normally closed by a diaphragm 12 extending transversely to the axes of the container 1 and closure 5, with the marginal portions 13 of said diaphragm rigidly embraced by and between divided portions 14, 14, of the annular flange 9, to produce a tight seal between the marginal edges of the diaphragm and the annular flange of the primary closure 5.

The primary closure 5 functions as a carrier for the diaphragm 12; and the interengaging screw threads 4 and 7 serve as a means for positively locking such carrier and diaphragm against axial movement relative to the neck 2 of the container 1.

The primary closure 5 is preferably composed of a material impervious to moisture and air, for example, one of the modern plastics, such as "Lucite," or one of the synthetic resins, such as "Bakelite," while the diaphragm 12 is composed of a flexible puncturable substance such as rubber, natural or synthetic.

In order to provide a tight, rigid connection between the marginal portions of the diaphragm 12 and the annular flange 9 of the primary closure 5, a fusion of the one with the other is preferably produced, as, for example, by placing the diaphragm in a suitable mold with the marginal portions exposed to the interior of the mold, and by molding the sleeve and flange portions of the closure 5 around the marginal edges 13 of the diaphragm 12, with a suitable flux, if such is deemed necessary, to cause integral connection between the diaphragm 12 and the closure 5.

Obviously, the primary closure 5 may be made of suitable metal, in which case the annular flange 9 of the primary closure 5 would be provided with an annular groove 15 for the reception of the marginal portions 13 of the diaphragm 12, after which the divided portions 14, 14 of the flange 9, lying on opposite sides of the annular groove 15, would be pinched together, axially, to grip the marginal portions of the diaphragm rigidly and thereby connect the diaphragm 12 to the primary closure 5 as an integral part thereof.

The primary closure 5 is provided with external coupling means, such as screw threads 16 for interthreaded engagement with internal threads 17 formed in a cylindrical wall 18 of a secondary external closure or cap 20 or other cooperatively formed coupling member not shown. The cap 20 includes an axial cavity 19, and a head 21 closing the one end of the cap. A sealing disc 10' is seated in the cap 20 against the head 21 and bears against the outer end surface 22 of the primary closure 5 to form a tight seal for the axial opening 11 in the primary structure 5, across which the diaphragm 12 extends.

The secondary closure or external cap 20, like the primary closure 5, may be composed of any suitable material which will be impervious to moisture and air, such, for example, as plastic, synthetic resin, metal, etc.

In the structure shown in Figs. 1 and 2, the biological or pharmaceutical, etc., is placed in the container 1, after which the container is first sealed by application of the primary closure 5 and additionally sealed by the outer cap or secondary closure 20 subsequently applied to the exterior of the primary closure 5.

If the contents of the container 1 are to be maintained under vacuum, a hypodermic needle is passed through the diaphragm 12 and the proper vacuum drawn through the bore of the needle. As the needle is withdrawn, the flexible resilient nature of the diaphragm causes the hole formed by the needle to close and seal itself. Such drawing of the vacuum, of course, is formed before the application of the cap 20.

If an inert gas under positive pressure is to be maintained in the container 1, the air within the container 1 is first withdrawn in the manner above noted, whereupon the gas pressure is injected through the hypodermic needle prior to withdrawal of the needle from the diaphragm 12.

By reason of the diaphragm being a substantially integral portion of the primary closure 5, and by reason of the closure 5 being rigidly locked in position on the container 1, by and through the interlocking engagement of the screw threads 4 and 7, the diaphragm 12 is held rigidly against axial displacement by the pressure within the container.

Due to the sleeve portion 8 and annular flange 9 of the primary closure 5 being composed of material which is impervious to air and moisture, and due to the cap 20 being likewise composed of material impervious to both air and moisture, and due to the outer cap or secondary closure 20 being positively locked and tightly sealed against the surface 22 of the primary closure 5, no moisture, air or gas can possibly enter the container 1 while the package is stored.

It is well known that rubber is not absolutely impervious to penetration by moisture, air or gas, and will in time permit the passage of these elements therethrough, however, the progress is exceedingly slow, therefore, during the short time necessary to withdraw a dose from the container 1 by the hypodermic needle, the diaphragm 12 would not be exposed for a sufficient length of time to permit of such passage of extraneous air, moisture or gas to the interior of the container 1.

In the course of use, the outer cap or secondary closure 20 would be applied immediately after withdrawal of the hypodermic needle from the diaphragm 12. Thus, the structure disclosed in Fig. 1 provides a package in which the contents are at all times sealed against entrance of extraneous air, gas or extraneous moisture. At the same time, the outer or secondary closure 20 seals the package absolutely against the loss of any of the contents which may, in a long period of storage, permeate outwardly through the diaphragm 12.

In order to obtain a firm grip on the primary closure 5, to prevent its being loosened on the bottle-neck 2 when removing the outer cap 20, the lower portion 23 of the sleeve 8 is exposed below the lower edge of the cap 20 and is fluted, knurled, or otherwise formed to provide an efficient gripping surface thereon.

In the structure shown in Figs. 3 and 4, the primary closure 5a is elongated axially and is provided with internal threads 7a, located in one end thereof, and external threads 16a formed on the opposite end thereof. An annular shoulder 9a, corresponding to the shoulder formed by the under side of the annular flange 9, previously noted, seats against the flat surface of the outer end of the bottle-neck 2, with a sealing washer 10a therebetween, and forms a seal, together with the seal formed by the external threads 4 on the bottle-neck 2 and the internal threads 7a on the inner end of the primary closure 5a.

The diaphragm 12a is mounted in the annular flange 9b which, in this instance, is formed at the extreme outer end of the primary closure 5a and is enclosed normally by the secondary closure 20a. The internal threads 17a of the cap 20a cooperate with the external threads 16a of the primary closure 5a, while the disc 10' lying against the under side of the rigid head 21a of the outer cap or secondary closure 20a seats against the end surface 22a of the primary closure 5a, forming a seal therebetween.

In the structure shown in Figs. 3 and 4, the exterior of lower inner end 23a of the primary closure 5a is exposed, when the cap 20a is in place, and may be knurled, fluted, or otherwise roughened, to provide a gripping surface, whereby the primary closure 5a may be held against unthreading from the neck 2 of the bottle while the outer cap 20a is being removed from the opposite or outer end of the primary structure 5a.

In the structure shown in Figs. 5 and 6, the body of the primary closure structure 5b is of the elongated character, with the internal threads 7a at one end cooperating with the external threads 4 on the neck 2 of the container 1, to secure the primary closure to the bottle-neck. The external threads 16a are formed on the opposite end of the primary structure body 5b in substantially the same manner as in the elongated structure shown in Fig. 4. However, in the structure shown in Fig. 6, the diaphragm 12b is held in an annular flange 9c which is disposed about midway between the extreme opposite ends of the elongated closure 5b, with a washer 10 adjacent the under side of the flange 9c bearing against the outer end of the bottle-neck 2 and rigidly sealing the structure.

In the structure shown in Fig. 6, a supplementary primary closure 5c, corresponding substantially to the primary closure structure 5 of Fig. 2, is mounted on the outer end of the primary closure structure 5b, with the internal threads 7c of the supplementary closure structure 5c threaded onto the external threads 16a of the primary structure 5b. The diaphragm 12c of the supplementary closure structure 5c is held in the internal flange 9d of the supplementary closure structure 5c. A sealing washer 10, lying adjacent the under side of the flange 9d, seats against the outer end 22b of the primary closure structure 5b. The supplementary structure 5c is provided also with external threads 16b which receive the internal threads 17b of a secondary closure structure or external cap 20b. A sealing disc 10', seated against the inner surface of the rigid head 21b of the cap 20b, seats against the outer end surface 22c of the supplementary closure structure 5c.

In the structure shown in Fig. 6, the diaphragms 12b and 12c are spaced apart axially at the opposite ends of a compartment 24 formed by and between said diaphragms in the outer end of the body of the primary closure structure 5b. In using this structure a sterile liquid may be contained in the bottle 1 and another liquid or powder may be separately contained in the compartment 24. A hypodermic needle may be inserted through the diaphragm 12c into the compartment 24, to be filled with the contents of the compartment 24 by suction applied to the needle, whereafter the needle may be advanced through the diaphragm 12b into the sterile liquid in the container 1 and the contents of the needle, as carried from the compartment 24, may then be discharged into the container 1 for a mixing of the two ingredients therein.

The reverse to the above procedure may be carried out by inserting the needle through both diaphragms into the container 1, to withdraw a portion of the liquid therefrom, after which the needle may be withdrawn until its end is situated beyond the diaphragm 12b, within the compartment 24, whereupon the contents of the hypodermic may be discharged into the compartment 24 to mix therewith or to dissolve such contents, after which a portion or all of the mixture or solution may be withdrawn completely from the package by the needle through the diaphragm 12c, or reintroduced into the container 1. The self-sealing nature of the diaphragms 12b and 12c will wipe the exterior of the needle clean of any of the contents of the receptacle 1 or the compartment 24 as the needle is completely withdrawn from the package.

In the structure shown in Fig. 8, a primary closure structure 5 is first applied to the neck 2 of the receptacle 1, in the same manner as previously described with respect to Fig. 2. A supplementary and axially-elongated closure structure 5d, having internal threads 7d for interlocking engagement with the external threads 16 of the primary structure 5, is applied to said primary structure with an annular shoulder 9e of the supplementary closure structure 5d bearing against the outer end surface 22 of the primary closure structure 5.

The outer end of the supplementary structure 5d is formed in a similar manner to the outer end of the supplementary structure 5a of Fig. 4, with the diaphragm 12a of the structure 5d held by and in the annular flange 9b, in axially-spaced relation to the diaphragm 12 of the primary structure 5, to provide the compartment 24 in the supplementary closure structure 5d, between the diaphragms 12 and 12a.

As in Fig. 4, an outer cap or secondary closure 20a is adapted to be applied to the outer end of the supplementary closure structure 5d, with the internal threads 17a of the cap 20a threaded onto the external threads 16a of the supplementary structure 5d.

In the device shown in Fig. 9, a container 1a is provided with a neck 2a having a diametrically-enlarged portion 25 which is provided with external threads 26, and an axially-extended portion 27, of relatively smaller diameter, which is provided with an annular lip or rim 28 at its extreme outer end. An annular groove 29 is formed externally of the neck 2a, between the lip 28 and the externally-threaded enlarged portion 25. In this instance, the diaphragm 12d is held around its marginal edges in a metallic ring 30, by axial compression, as previously noted.

The diaphragm ring or carrier 30 is adapted to be seated or force-fitted in an internal recess formed in a primary closure 5e, which, in this instance, is in the form of a crimped bottle cap having a skirt 31 which fits over the lip 28. The lower portion 32 of the skirt 31 is crimped and forced into the annular groove 29, to positively lock the primary closure 5e, including the cap and the carrier, in sealing position against the end of the receptacle 1a. The primary closure 5e, in this instance, is provided with an annular flange 9f which bears against the diaphragm carrier ring 30, forcing it into said sealing engagement with the end of the bottle-neck. Sealing rings or washers 10 are provided between the carrier 30 and the end of the bottle-neck and between the carrier and the flange 9f, if desired.

A secondary closure or outer cap 20c is adapted to be slipped downwardly over the entire primary closure 5e and to have the internal threads 17c thereof threaded onto the external threads 26 of the enlarged portion 25 of the bottle-neck 2a, with a sealing disc between the head of the cap and the top of the carrier ring.

In the device shown in Fig. 10, the outer cap 20d is of the clamp type, i. e. the skirt 41 is rolled around a clamp wire 42 at the lower edge of the cap 20d and is slotted upwardly through and beyond said rolled edge at spaced intervals around the circumference of the cap. The rolled edge of the cap 20d snaps over a circumferential, radially-extending coupling means in the form of a rib 43 formed on the crimped-on primary structure 5e. A cam 44, having an operating lever 45, is mounted on the clamp wire 42 and, when the lever 45 is moved from its full line position to its broken line position, forces the high point of the cam into position behind the rib 43 and tightens the wire 42 so that said wire draws the rolled edge of the cap 20d into position behind said rib, thus locking the cap 20d in position, it being understood that the primary structure 5e, aside from the rib 43, is of the same crimp-type cap as disclosed in Fig. 9.

In the device shown in Fig. 11, the primary structure 5k is formed of pressed metal, for example, and is threaded onto the neck of the container, the outer cap or secondary closure 20k is similarly formed of pressed metal and is threaded onto the external threads of the primary closure, with a knurled skirt 23k of the primary structure 5k extending below the lower edge of the secondary closure 20k.

In Fig. 11, the diaphragm 12k is fitted into a counter-bore in one end of a carrier ring 30k, and a sealing washer or ring 10k is fitted into a similar counter-bore in said carrier ring. The periphery of the carrier ring 30k is threaded to fit the internal threads of the primary structure 5k.

The marginal edges of the diaphragm 12k and the sealing ring 10k are preferably fused to the carrier ring 30k. The marginal portions of the upper side of the diaphragm 12k engage the under side of the internal flange 9k of the primary structure 5k and the underside of the sealing ring 10k bear against the end of the container to form a seal.

The secondary closure 20k is provided with a sealing disc 10' which bears against the outer surface of the flange 9k to form a seal.

In the structures shown in Figs. 12, 13, 14 and 15, the diaphragms 12d are rigidly mounted in carriers 30, such as previously described in regard to Fig. 9. In Fig. 12, a single diaphragm is mounted in an annular cavity 15a formed in the internal flange 9g of the primary closure structure 5f and is forced by the cooperating screw threads on the neck of the bottle and in the primary closure into rigid sealing contact with the end of the neck of the bottle. Preferably the carrier 30 is a forced fit within the annular recess 15a so that the diaphragm 12d, the carrier 30, and the primary closure 5f constitute one integral structure. However, the carrier may be threaded into the primary structure or otherwise locked in place in the recess 15a.

A secondary closure structure 20 is threaded onto the exterior threads of the primary closure structure 5f in the same manner as previously described with regard to Figs. 1 and 2, etc.

In Fig. 13, the diaphragm carrier 30 is seated in an annular recess 33 formed in the extreme outer end of the neck of the receptacle, and the internal flange 9h of the primary closure structure 5g bears against the carrier 30 and forms a rigid seal. In this instance, also, an outer cap or secondary closure is screwed onto the external threads of the primary sealing structure 5g.

In Fig. 14, a pair of diaphragm carriers 30, 30 are disposed in axially-spaced relationship, with a spacer 34 therebetween, within the axially-elongated primary closure structure 5h, with a cavity 24 formed between said diaphragm carriers within the spacer 34. The annular flange 9i of the primary closure structure 5h forces the two diaphragm carriers 30, 30 and the spacer 34 together axially and into rigid sealing contact with each other and with the end surface of the bottle-neck, when the primary structure 5h is screwed onto the neck of the receptacle.

In Fig. 14, a secondary closure or cap 20a is threaded onto the external threads at the outer end of the primary closure 5h to complete the seal for storage purposes.

In the structure shown in Fig. 15, the two diaphragm carriers 30, 30 and the spacer 34 are maintained in an elongated cavity formed in the neck of the bottle by the internal flange 9j of the primary closure 5i to provide the compartment 24, and a secondary closure structure 20 is threaded onto the external threads of the primary closure structure 5i to complete the sealing of the package for storage purposes.

In Figs. 16 to 21, inclusive, various forms of diaphragms, which are adapted to be used either in the carriers 30 or in the primary and supplementary closure structures, are shown. For example, in Fig. 16, the diaphragm 12e is provided with a thickened marginal edge 13e and a thinned central membrane portion 36.

In Fig. 17, the diaphragm 12f is provided with its marginal edges 13f and a central membrane portion 36a of substantially the same thickness, with the membrane portion offset axially with respect to the marginal portions 13f.

In Fig. 18, the diaphragm 12g is provided with marginal portions 13g and a central membrane portion 36b of substantially the same thickness, with the membrane portion offset axially to a lesser extent than in Fig. 17, and in the opposite direction thereto.

In Fig. 19, the diaphragm 12h is provided with marginal portions 13h of relatively thin character and a relatively thicker membrane portion 36c projecting in opposite directions axially beyond the plane of the marginal portions 13h.

In Fig. 20, the diaphragm 12i is provided with relatively thin marginal portions 13i adapted to be held within the carrier 30a, and additional marginal portions 13j adapted to overlap the carrier 30a on one face thereof to form a resilient seat, for example, between the carrier 30a and the end of the neck of the receptacle when the carrier is pressed into sealing contact with the end surface of the neck, as in Fig. 9, for example.

In Fig. 21, the diaphragm 12k is fused around its marginal edges to one face of a ring of plastic or other suitable material 30k while a sealing ring or washer 10k is correspondingly secured to the opposite face of the ring. This structure is adapted to be substituted for the diaphragm and carrier in such structures as are shown in Figs. 9 to 15, inclusive.

It is to be noted that the exterior coupling means on the primary closure member is employed not only in attaching the external or secondary closure member to the primary closure member but is also utilized in detachably connecting the container when provided with the present invention to cooperatively formed coupling members on charging manifolds when the pharmaceuticals are being packaged under pressure or under vacuum as previously referred to; also, when the containers are used for culturing of certain micro-organisms, they may be secured to such manifolds for charging the containers with known gases, or for evacuating gases or vapors therefrom. In such instances, hollow needles which penetrate the self-sealing diaphragms may be associated with such manifolds to facilitate these operations. It will also be noted that the external diameter of the outer end of the primary closure is no greater than the root diameter of the screw threads on said end or the root diameter of the threads on the cooperatively formed coupling member, so that the last mentioned member may be directly applied, without obstruction, to the screw threads on the primary closure.

We claim:

1. An article of manufacture in the form of a closure for a container, comprising an axially-bored body, a puncturable, self-sealing diaphragm extending across said bore, said diaphragm being fused around its peripheral edge to said body, means within and adjacent one end of said bore for securing said closure to the container, and coupling means on the exterior of said body for securing a cooperatively formed coupling member thereto, the opposite end of said axially bored body being formed and dimensioned to receive said coupling member and being of no greater external diameter than the internal diameter of said coupling member.

2. An article of manufacture in the form of a primary closure for a container, comprising an axially-bored body, a puncturable, self-sealing diaphragm extending across said bore, said diaphragm being fused around its peripheral edge to said body, screw thread means within and adjacent one end of said bore for securing said primary closure to the container, and screw thread means on the exterior of and located adjacent the opposite end of said body for securing a secondary closure thereto, said opposite end of the body being of no greater external diameter than the root diameter of the screw threads on the exterior thereof.

3. An article of manufacture in the form of a closure for a container, comprising a body member provided with a bore extending longitudinally therethrough, a puncturable, self-sealing diaphragm carried by said body member and extending across said bore and sealing the same, means within said bore adjacent one end thereof for securing said closure to said container, and screw thread coupling means on the exterior of said body member adjacent the opposite end thereof for securing a cooperatively formed coupling member thereto, said opposite end of the body member being of no greater external diameter than the root diameter of the screw threads of said coupling means.

4. An article of manufacture in the form of a closure for a container comprising a body member provided with a bore extending longitudinally therethrough, a puncturable, self-sealing diaphragm carried by said body member at one end thereof and extending across the bore and sealing the same, means within said bore for securing said closure to said container, and screw thread coupling means on the exterior of said body member for securing a cooperatively formed coupling member thereto, the external diameter of said body member at said one end being no greater than the root diameter of the screw threads on the exterior of said body member.

5. An article of manufacture in the form of a closure for a container comprising a body member provided with a bore extending longitudinally therethrough, a puncturable, self-sealing diaphragm carried by said body member adjacent one end thereof and extending across and sealing said bore, means within the bore for securing said closure to said container, said body member terminating at the diaphragm-carrying end thereof in an annular sealing surface beyond the exposed central portion of said diaphragm, and screw thread coupling means carried by said body member externally thereof for securing a cooperatively formed coupling member in operative sealing engagement with said body member, the external surface of the end of said body member which carries said sealing surface being of no greater diameter than the root diameter of the threads thereon.

ABRAHAM CANTOR.
HERMAN A. SHELANSKI.